United States Patent
Ford et al.

(10) Patent No.: US 6,551,531 B1
(45) Date of Patent: Apr. 22, 2003

(54) MOLDS FOR MAKING OPHTHALMIC DEVICES

(75) Inventors: James D. Ford, Orange Park, FL (US); James F. Kirk, Jacksonville, FL (US); Frank F. Molock, Orange Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/532,233

(22) Filed: Mar. 22, 2000

(51) Int. Cl.⁷ .............................................. B29D 11/00
(52) U.S. Cl. ...................... 264/2.5; 249/117; 264/1.38; 425/808
(58) Field of Search ...................... 264/1.1, 2.3, 1.36, 264/1.38; 425/808; 249/117, 160

(56) References Cited

U.S. PATENT DOCUMENTS

| | | | |
|---|---|---|---|
| 4,197,266 A | * | 4/1980 | Clark et al. ................... 264/2.3 |
| 5,158,718 A | * | 10/1992 | Thakrar et al. ............... 264/2.3 |
| 5,160,749 A | * | 11/1992 | Fogarty ....................... 264/2.3 |
| 5,578,332 A | | 11/1996 | Hamilton et al. |
| 5,779,943 A | | 7/1998 | Enns et al. |
| 5,843,346 A | | 12/1998 | Morrill |
| 5,849,209 A | | 12/1998 | Kindt-Larson et al. |
| 5,975,694 A | | 11/1999 | Vayntraub |
| 5,975,875 A | | 11/1999 | Crowe, Jr. et al. |
| 5,977,035 A | | 11/1999 | Sugiura et al. |

FOREIGN PATENT DOCUMENTS

| | | |
|---|---|---|
| EP | 735092 | 10/1996 |
| EP | 985520 | 3/2000 |
| WO | WO 9713635 | 4/1997 |
| WO | WO 99/47344 A2 | 9/1999 |
| WO | PCT/US01/09075 | 10/2001 |

* cited by examiner

Primary Examiner—Mathieu D. Vargot

(57) ABSTRACT

Ophthalmic lens are made by reacting a lens forming mixture in a mold to form a polymer. The polymer is then demolded from the mold and processed into a completed lens. The molds are made of at least two parts, a first part having a surface for forming the polymer into a portion of the lens and a second part having a surface for forming the polymer into a portion of the lens. The first and second parts of the mold each have different surface energies.

15 Claims, No Drawings ved in casting processes. These processes involve injecting a reactive lens forming mixture of polymerizable monomers and other materials in a mold and curing the mixture by exposure to UV light or heat in the presence of an appropriate photoinitiator or catalyst. The molds are usually made of a number of cavities having female and/or male base surfaces or curvilinear mold portions for the formation of the curved ophthalmic lenses. The lens is formed at the interface of the mold surfaces.

MOLDS FOR MAKING OPHTHALMIC DEVICES

BACKGROUND OF THE INVENTION

This invention relates to molds and mold components for the manufacture of ophthalmic lenses such as contact lenses.

Ophthalmic lenses such as contact lenses are most often manufactured in casting processes. These processes involve injecting a reactive lens forming mixture of polymerizable monomers and other materials in a mold and curing the mixture by exposure to UV light or heat in the presence of an appropriate photoinitiator or catalyst. The molds are usually made of a number of cavities having female and/or male base surfaces or curvilinear mold portions for the formation of the curved ophthalmic lenses. The lens is formed at the interface of the mold surfaces.

A common problem is the adhesion of the lens formed in the mold to one or both of the mold parts. Edge tears and chips, nicks or other surface defects as well as holes, voids, pits, i.e. areas on non-uniform thickness, and puddles formed in the ophthalmic lenses can occur when the adhesion is too great. This problem is exacerbated in processes for making lenses with thin edges or intricate edge geometries. Separating mold halves or mold parts without causing damage to the lens formed in the mold is thus critically important to commercial lens making processes.

One method for dealing with this problem has been the incorporation of additives such as zinc stearate in the mold materials or the inclusion of mold release agents. Unfortunately, these agents can adversely affect mold surface texture or bulk polymer properties. Adjustments to the time, temperature, and heating profile of the cure and demold processes has also been used to affect the adhesion of the lens to at least one of the mold parts. Often, the adjustments to the cure and demold processes that might be helpful in solving the adhesion problem negatively affect the quality of the lens made. Mechanical and optical properties can be seriously eroded or altered.

Japanese Kokai application JP 98-133667 proposes an assembly of first and second molds consisting of a base mold with a thermoplastic film that covers the base mold on the cavity side. The base mold was made of PMMA with a polyethylene film and a female mold made of polypropylene.

Simple methods for reducing or eliminating production loss of lenses due to adhesion to multiple mold parts are still in great demand.

SUMMARY OF THE INVENTION

The invention is a method of making an ophthalmic lens by reacting a lens forming mixture in a mold to form a polymer. The polymer is then demolded from the mold and formed into a completed lens. The molds are made of at least two parts, a first part having a surface for forming the polymer into a portion of the lens and a second part having a surface for forming the polymer into a portion of the lens. The first and second parts of the mold each have different surface energies.

In another aspect of the invention, an ophthalmic lens mold comprises at least two parts. The first part has a surface for forming a portion of the lens and a second part has a surface for forming the lens. The first and second parts are each made from a material having different surface energies. The combination of the first and second mold parts form a cavity. The ophthalmic lenses are formed in the cavity from the reaction of a ophthalmic lens forming mixture.

In yet another aspect of the invention, an ophthalmic lens making mold kit comprises at least one first mold part and at least one second mold part. The first and second mold parts have different surface energies. When they are combined they formed a cavity at their interface for the formation of the ophthalmic lenses.

DETAILED DESCRIPTION

An "ophthalmic lens" refers to an intraoccular lens, contact lens, or other similar device through which vision is corrected or eye physiology is cosmetically enhanced (e.g., iris color) without impeding vision.

A "lens forming mixture" as the term is used throughout this specification refers to a mixture of materials that can react or be cured to form an ophthalmic lens. Such a mixture includes polymerizable components (monomers), additives such as UV blockers and tints, photoinitiators or catalysts, and other additives one might desire in an ophthalmic lens such as a contact or intraoccular lens. Suitable lens forming mixtures are described more fully in U.S. Pat. No. 5,849,209 (as a reactive monomer mix including crosslinking agent and initiator); U.S. Pat. No. 5,770,669 (as a prepolymerization mixture including monomers and initiator); and U.S. Pat. No. 5,512,205 (as a prepolymer plus monomer system including crosslinkers and initiators) each of which is incorporated herein by reference. Lens forming mixtures for making silicone based hydrogel lens are most preferred including those comprising silicone/hydrophilic macromers, silicone based monomers, initiators and addtives.

The terms "mold" and "mold assembly" as used throughout this specification refer to a form having a cavity into which a lens forming mixture is dispensed such that upon reaction or cure of the lens forming mixture, an ophthalmic lens of a desired shape is produced. The molds and mold assemblies of this invention are made of more than one mold part and form the mold or mold assembly by the combination of the parts. This combination of mold parts is preferably temporary. The mold parts are brought together with a cavity formed between them in which the lens is formed and upon formation of the lens the mold is again separated into mold parts for removal of the lens as described below.

A "mold part" or "mold piece" as the term is used in this specification refers to a portion of mold, which when combined with another portion of a mold forms a mold or mold assembly. The molds of this invention are formed from at least two mold parts. At least one mold part has at least a portion of its surface in contact with the lens forming mixture such that upon reaction or cure of the mixture that surface provides the desired shape and form to the portion of the lens with which it is in contact. The same is true of at least one other mold part.

Thus, for example, in a preferred embodiment a mold is formed from two parts, a female concave piece (front piece) and a male convex piece (back piece) with a cavity formed between them. The portion of the concave surface in contact with lens forming mixture has the curvature of the front curve of a ophthalmic lens to be produced in the mold assembly and is sufficiently smooth that the surface of a ophthalmic lens formed by polymerization of the lens forming mixture in contact with the surface is optically acceptable. Preferably, the front mold piece also has an annular flange integral with and surrounding circular circumferential edge and extends from it in a plane normal to the axis and extending from the flange. The back mold piece has a central curved section with a concave surface, convex surface and circular circumferential edge, wherein the portion of the convex surface in contact with the lens forming mixture has the curvature of the back curve of a ophthalmic lens to be produced in the mold assembly and is sufficiently smooth that the surface of a ophthalmic lens formed by reaction or cure of the lens forming mixture in contact with the back surface is optically acceptable. The back curve also has an annular flange integral with and surrounding the circular circumferential edge and extending from it in a plane normal to the axis of the convex structure. The inner concave surface of the front mold half defines the outer surface of the lens, while the outer convex surface of the base mold half defines the inner surface of the lens.

In this assembly, the back mold piece is made of a material having a substantially different surface energy than the front mold piece. A material has a substantially different surface energy from another material when, after polymerization in a mold made from mold parts of such materials, and upon separation of the mold parts, the lens formed in contact with a surface of each does not adhere one mold part relative to another mold part with which it is in contact. Further, the absence of adhesion to the at least one mold part occurs in the absence of a mold release agent or surface active agent. Monomer undergoing polymerization increases in density or, conversely, shrinks in volume. Given that the lens approximates a thin-walled hemispherical shell, this shrinkage makes the molded part tend towards adherence to the convex mold surface and tend towards delamination from the concave mold surface. Thus, the concave-mold surface has a surface energy at least about 1.0 mN/m higher than the convex mold-surface material surface energy (at the temperature at which the lenses are demolded), as evaluated by Zisman's Surface Energy concept. Preferably, the difference is at least about 5 mN/m, and mort preferably it is at least about 9 mN/nm In the most preferred embodiment, the front curve mold surface is a TOPAZ brand polymer made from a cyclic olefin (described more fully below) having a surface energy of 35.9+/−1.0 mN/m and the base curve mold is a polypropylene mold surface having a surface energy of 26.6+/−0.9 mN/m. This difference is sufficient to combat the bias towards adherence to the base curve.

The mold parts of this invention have different surface energies as a function of their composition and not the presence of mold release agents or surface active agents. Preferably, the mold parts comprise a unitary, homogeneous composition to imbue them with the surface energy of interest. It is most preferred that the mold parts are injection molded from neat polymers having only, at most, processing aids present in them. Neat polymers without processing aids are even more preferred. For example, in a most preferred embodiment, one mold part is made of neat isotactic or syndiotactic polypropylene and another mold part is made of a neat cyclic olefin copolymer such as an ethene-norbornene copolymer. It is also possible to select for use as one of the mold parts, dissimilar materials that are not necessarily synthetic polymers. For example, one mold part can be made from a synthetic material and another can be made of a metal, metaloid, ceramic, or glass composition provided that the two different materials have the different surface energies described above.

With respect to the cyclic olefinic copolymer, the cyclic olefins useful in making them are the cyclic monomers of U.S. Pat. Nos. 5,087,677 and 5,008,356 each of which is incorporated herein by reference. Other suitable cycloolefinic copolymers useful in this capacity are also commercially available or methods for their production are known as, for example, in U.S. Pat. Nos. 5,545,829, 5,567,776, and 5,567,777 European Patent Application Nos. 203,799, 355,682, 485,893, and 503,422, which references are incorporated herein in their entireties by reference. The preferred cycloolefinic copolymers of this class are random polymers of the formula:

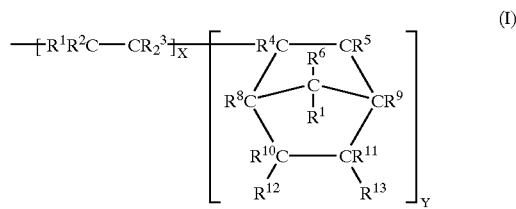

wherein $R^1$ through $R^3$ are each independently H, a $C_{1-8}$ aliphatic or cycloaliphatic group; $R^4$ through $R^{13}$ are each independently H, $C_{1-10}$ alkyl, cycloalkyl, aryl, $C_{3-10}$ alkylene, $C_{3-10}$ cycloalkenyl groups; X+Y=1, and X=0.05 to 0.9. Preferably, $R^1$ through $R^3$ are H or $C_{1-7}$ aliphatic groups; $R^4$ through $R^{13}$ are H; X is 0.4–0.6 and Y is 0.6–0.4. Most preferably, $R_1$–$R_{13}$ are H and X and Y are each 0.5. These polymers have glass transition temperatures (Tg) of about 77° C.–315° C. Preferably the Tg is about 77° C.–110° C. for ease of injection molding.

The most preferred class of cycloolefinic copolymers of this type are commercially available from Ticona Polymers (formerly Hoechst) under the name TOPAS® polymers. Within the TOPAS® class of polymers, those that are random copolymers which are the reaction products of ethene and norbornene are most preferred.

Other preferred combinations of materials for at least two different mold parts used to make the molds of this invention include:

| Front (concave) | Back (convex) |
|---|---|
| TOPAS Polymer | Polypropylene |
| TOPAS Polymer | Polystyrene |
| TOPAS Polymer | Polyethylene |
| Polystyrene | Polypropylene |
| Polystyrene | Polyethylene |

However, as a general matter, other combinations of molds sections will provide the benefits of this invention provided that they have the different surface energy characteristics described above.

Although less preferred, multilayer structures can also be used to produce mold parts having significantly different surface energies. In such structures, the bulk of the mold part is made of one material and its surface comprises a layer of a different material having the desired surface energy. Such a mold could be made from a combination of mold parts in which one part made from a polyamide coated with a polypropylene surface while another mold part is made from the ethene-norbornene copolymer. Preferably, such materials would be made in a coextrusion process using a suitable tielayer. Alternatively, it is possible to fashion a mold from one or more mold parts made from metals, ceramics, and other materials provided that one mold part has a sufficiently different surface energy from other mold part within which the formed lens is in contact.

At least one of the mold parts is preferably made from a material transparent to either UV or visible light. This facilitates the preferred method of cure of the lens material by photoinitiation to promote the subsequent polymerization of a soft contact lens. Amorphous polymers such as atactic polystyrene are generally most suitable in this regard. The mold parts are designed with a thinness (typically 0.8 mm) and rigidity effective to transmit heat rapidly through it and to withstand prying forces applied to separate the mold parts from the mold during demolding.

Ophthalmic lenses are prepared in the molds of this invention by various techniques known to be skilled artisan. Generally, these simply involve forming a mold from mold parts, injecting an ophthalmic lens forming mixture into the cavity of the mold, curing the lens forming mixture into a lens as through exposure to UV radiation, demolding such that the lens is formed on only a portion of the mold, hydrating the formed lens, finishing and packaging the lens so formed. Further description of such processes can be found in U.S. Pat. No. 4,495,313 to Larsen, U.S. Pat. No. 4,565,348 to Larsen, U.S. Pat. No. 4,640,489 to Larsen et al., U.S. Pat. No. 4,680,336 to Larsen et al., U.S. Pat. No. 4,889,664 to Larsen, et al. and U.S. Pat. No. 5,039,459 to Larsen et al., the contents of which are all incorporated herein by reference.

Notably, in these processes, the demolding process generally requires separation of the mold parts. In one demolding technique, a back curve lens mold is heated creating a differential expansion of the heated mold polymer relative to the cooler lens polymer which shifts one surface with respect to the other. The resultant shear force breaks the polymerized lens/polymer mold adhesion and assists in the separation of mold portions. The greater the temperature gradient between the surfaces of the mold portions, the greater the shearing force and the easier the mold portions are separated. This effect is greatest when there is maximum thermal gradient. As time continues, heat is lost through conduction from the back mold portion into the lens polymer and the front mold portion, and then collectively into the surrounding environment. The heated back mold portion is, therefore, promptly removed so that very little energy is transferred to the polymer lens, avoiding the possibility of thermal decomposition of the lens. The heating may be accomplished by techniques known to one skilled in the art such as by steam, laser and the like. The process of laser demolding is described in U.S. Pat. No. 5,294,379 to Ross et al, the contents of which are incorporated by reference.

If the heating step is hot air or steam, after the heating step, the back curve is pried from the front curve and mold in the mold assembly. If on the other hand, the heating is by laser or infrared energy, no prying is used and the back curve separates spontaneously from the front curve.

The back curve mold part can also be physically pryed from the front curve portion of each ophthalmic lens mold to physically expose each ophthalmic lens situated in the lens mold for conveyance to a hydration station for hydration of the lenses.

When the mold is made from parts having significantly different surface energies according to this invention, the number of lenses that are formed but are unusable because they contain defects, such as chips or edge tears or holes, i.e., voids in the center of the cast lenses are greatly reduced. For example, when a front curve lens mold portion is made of copolymer of ethene and norbornene and a back curve lens mold portion is made of polypropylene, in a prying action between the lens mold parts, as occurs during demolding, the lens will slip more easily from the convex mold portion.

The invention is further illustrated by the following nonlimiting examples.

EXAMPLE 1

Mold Part Manufacture

Contact lens molds were injection molded on a NETSTAL injection molding machine. Standard eight cavity molds of the type described in U.S. Pat. No. 4,640,489 were produced. Front curve mold halves were injection molded using neat "TOPAS®" copolymers of ethene and norbornene obtained from Hoecsht (now Ticona Polymers). They were molded at temperatures of about 104° C. with an injection pressure of about 632 kg/cm$^2$ and a screw speed of about 150 rpm. Back curve mold halves were made from atactic polystyrene obtained from Exxon Chemical Company under the trade name "ESCORENE PP-EXXON PP1105" and polystryene obtained from Huntsman Chemical Company under the trade name "HUNTSMAN PS-202".

The surface energy of the mold parts was determined using the Zisman surface energy concept as follows. Samples for each frame 4.5 mm width and 3 mm thick were prepared and the advancing contact angle data versus surface tension was plotted using a series of probe liquids of different surface tension and a Cahn DCA 315 instrument.

The advancing angle of each sample is linear function of surface tension for a homologous series of liquids. Each line extrapolates to zero contact angle at the critical surface tension—which is equivalent to the surface energy of the given sample.

Frame samples were cycled once in the probe liquids water ($\gamma$=72.8 mN/m), Glycerin ($\gamma$=63.4 mN/m), Ethylene Glycol ($\gamma$=47.7 mN/m) and Benzyl Alcohol ($\gamma$=39.0 mN/m). Cycles were averaged for three samples per lot in each probe liquid to obtain advancing angle data. Results are shown in Table 1.

TABLE 1

| Frame | Surface Energy mN/m | R Square |
| --- | --- | --- |
| Topas Polymer | 35.86 | .9554 |
| Polystyrene | 33.22 | .9448 |
| Polypropylene | 26.64 | .9102 |

EXAMPLE 2

Lens Yield

Mold assemblies were fashioned according to U.S. Pat. No. 4,640,489 from different combinations of mold parts made according Example 1. Mold A was a mold assembly having a front curve mold half made of TOPAS copolymer and a back curve mold half made of polypropylene.

An ophthalmic lens forming mixture was prepared by combining the following (all amounts are calculated as weight percent of the total weight of the combination): macromer (~18%); an $Si_{7-9}$ monomethacryloxy terminated polydimethyl siloxane (~28%); methacryloxypropyl tris (trimethyl siloxy) silane, "TRIS" (~14%); dimethyl amide, "DMA" (~26%); hydroxy ethyl methacrylic acid, "HEMA" (~5%); triethyleneglycoldimethacrylate, "TEGDMA" (~1%), polyvinylpyrrolidone, "PVP" (~5%); with the balance comprising minor amounts of additives and photoinitiators. The macromer was prepared by the Group Transfer Polymerization (GTP) of about 19.1 moles of 2-hydroxyethyl methacrylate, 2.8 moles of methyl methacrylate, 7.9 moles of methacryloxypropyltris (trimethylsiloxy)silane, and 3.3 moles of monomethacryloxypropyl terminated mono-butyl terminated polydimethylsiloxane. The macromer was completed by reacting the aforementioned material with 2.0 moles per mole of 3-isopropenyl-$\alpha,\alpha$-dimethylbenzyl isocyanate using dibutyltin dilaurate as a catalyst.

The lens forming solution was then pumped into each of the molds described above. To do this, eight individually controlled dosing pumps delivered monomer through eight tubes which terminated directly over the eight front-curve frame cavities when the frame was in the dosing station. Polymerization then occurred under a nitrogen purge and was photoinitiated with 5 mW cm$^{-2}$ of UV light generated with an Andover Corp. 420PS10-25 AM39565-02 light filter. Contact lenses were formed in the molds. The molds were then pried apart using an infrared (IR) demolding machine and the mold parts to which the lenses adhered were immersed in a 60:40 isopropyl alcohol/de-ionized water solution to hydrate the lenses which were subsequently removed from the mold part to which they were adhered and inspected under a modified microfiche reader (DL-2) at 13×.

The IR demolder lifts off the base curves and discards the same. Any lenses stuck to their respective base curves are also discarded. The loss rate due to demolding of the lens to the base curve dropped from ca. 50% to ca. 5% of the cavities processed. Further, a portion of the lens can remain attached to the base curve with another portion remaining attached to the front curve during the demolding cycle; causing significant distortion and tearing of the lens. The rate of this adverse event dropped from 10 to 15% of all cavities processed to ca. 0%. The following table presents the defect rates for two runs that used TOPAS polymer on TOPAS polymer mold pairs compared with two runs that used TOPAS polymer front curves with Polypropylene base curves (all with the same edge design).

| Run # | 1 | 2 | 3 | 4 |
|---|---|---|---|---|
| Mold Pair | T/T | T/T | T/P | T/P |
| Lenses lost to | | | | |
| demold & sub. proc. | 68% | 42% | 11% | 4% |
| Puddles | 2.4% | 18.8% | 1.3% | 0.0% |
| Excess | 3.5% | 4.8% | 24.4% | 18.2% |
| Holes | 18.3% | 33.9% | 33.3% | 55.8% |
| Edge chips | 21.0% | 51.6% | 1.3% | 6.5% |
| Edge tears | 42.9% | 37.4% | 14.1% | 2.6% |
| Surface tears | 0.8% | 1.3% | 0.0% | 0.0% |
| Partial lenses | 4.4% | 3.8% | 1.3% | 3.0% |

In more recent runs, the defect rate for holes is typically less than 5% and, for excess, typically less than 10%. Chips run between 10 and 20% and edge tears typically less than 10%.

We claim:

1. A method of making an ophthalmic lens comprising reacting lens forming mixture in a mold to form a polymer, demolding the polymer from the mold, and processing the polymer into a complete silicone based hydrogel lens; wherein said mold comprises at least two parts, a first part formed from a first material and having a surface for forming said polymer into a portion of said lens and a second part formed from a second material and having a surface for forming said polymer into a portion of said lens; said first part made from a material having a different surface energy than said second part and wherein said first and second materials are free of mold release agents and surface active agents, wherein either said first or said second material comprises a cyclic olefinic copolymer.

2. The method of claim 1 wherein the surface energies of the material used to from the first part and the material used to form the second part are different by at least about 10 mN/m.

3. The method of claim 1 wherein the surface energies of the material used to form the first part and the material used to form the second part are different by at least about 9.0 mN/m.

4. The method of claim 1 wherein said first part is made from a material selected from the group consisting of polystyrene, polypropylene, and polyethylene.

5. The method of claim 1 wherein the material used to make at least one of said parts is amorphous.

6. The method of claim 1 wherein the material used to make at least two of said parts is amorphous.

7. A mold for making ophthalmic lenses comprising at least two parts, a first part made from a first material formed from a first material and having a surface for forming a polymer into a portion of said lens and a second part made from a second material formed from a second material and having a surface for forming said polymer into a portion of said lens; said first part made from material having a different surface energy than said second part and wherein said ophthalmic lens is a silicone based hydrogel lens and said first and second materials are free of mold release agents and surface active agents, wherein either said first or said second material comprises a cyclic olefinic copolymer.

8. An ophthalmic lens mold comprising at least two parts, a first part formed from a first material and having a surface for forming a portion of said lens and a second part formed from a second material and having a surface for forming a portion of said lens; said first part made from a material having a different surface energy than said second part and said first and second materials are free of mold release agents and surface active agents; wherein, the combination of said first and second mold parts form a cavity therebetween for the formation of a silicone based hydrogel ophthalmic lenses from the reaction of a ophthalmic lens forming mixture therebetween, wherein either said first or said second material comprises a cyclic olefinic copolymer.

9. The mold of claim 8 wherein the surface energies of the material used to form the first part and the material used to form the second part are different by at least about 1.0 mN/m.

10. The mold of claim 8 wherein the surface energies of the material used to form the first part and the material used to form the second part are different by at least about 9.0 mN/m.

11. The mold of claim 8 wherein said first part is made from a material selected from the group consisting of polystyrene, polypropylene, and polyethylene.

12. The mold of claim 8 wherein the material used to make at least one of said parts is an amorphous polymer.

13. The mold of claim 8 wherein the material used to make at least two of said parts is an amorphous polymer.

14. The mold of claim 8 wherein said first or second part comprises a convex mold surface and the tendency of said lens to adhere to the convex mold surface is lessened.

15. An ophthalmic lens making mold kit comprising:

(a) at last one first mold part made from a first material; and (b) at last one second mold part formed from a second mold material, wherein said first and second materials are free of mold release agents and surface active agents and said first mold part having a different surface energy than said second mold part;

wherein the combination of said first and second mold parts form a cavity therebetween for the formation of said ophthalmic lenses from the reaction of a silicone hydrogel ophthalmic lens forming mixture, wherein either said first or said second material comprises a cyclic olefinic copolymer.

* * * * *